United States Patent
Inikori

(10) Patent No.: US 7,511,845 B2
(45) Date of Patent: Mar. 31, 2009

(54) METHOD AND SYSTEM FOR INTEGRATED PRODUCTION OF DOCUMENTS USING VARIABLE DATA FROM A DATA MANAGEMENT SYSTEM

(75) Inventor: Jonah A. Inikori, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1030 days.

(21) Appl. No.: 10/757,132

(22) Filed: Jan. 14, 2004

(65) Prior Publication Data

US 2005/0151999 A1   Jul. 14, 2005

(51) Int. Cl.
G06F 3/12 (2006.01)

(52) U.S. Cl. ............. 358/1.15; 358/474; 358/448; 358/401; 709/37; 709/26; 707/200.1

(58) Field of Classification Search ........... 358/1.15; 709/223, 213, 228; 705/37, 26, 17; 707/10, 707/200, 1, 200.1
See application file for complete search history.

(56) References Cited

U.S. PATENT DOCUMENTS

| | | | |
|---|---|---|---|
| 6,429,947 B1 | 8/2002 | Laverty et al. | |
| 7,058,705 B1 * | 6/2006 | Fukasawa et al. | 709/223 |
| 7,099,350 B2 * | 8/2006 | Peterson | 370/465 |
| 7,137,069 B2 * | 11/2006 | Abbott et al. | 715/744 |
| 7,177,868 B2 * | 2/2007 | Burton et al. | 707/10 |
| 7,313,612 B1 * | 12/2007 | Kakimoto | 709/223 |
| 2002/0078083 A1 * | 6/2002 | Armstrong | 707/501.1 |
| 2002/0123933 A1 * | 9/2002 | Himes | 705/17 |
| 2003/0083922 A1 * | 5/2003 | Reed | 705/9 |
| 2003/0093400 A1 * | 5/2003 | Santosuosso | 707/1 |
| 2006/0058982 A1 * | 3/2006 | Yamada et al. | 702/189 |
| 2008/0263190 A1 * | 10/2008 | Serizawa et al. | 709/223 |

* cited by examiner

Primary Examiner—Negussie Worku
(74) Attorney, Agent, or Firm—Maginot, Moore & Beck LLP

(57) ABSTRACT

A message bridge integrates a data management system with a document production system so that variable data may be provided to the document production system without off-line processing. The message bridge includes a transport adapter and a Web server. Preferably, a transport adapter resides at the data management system and a transport adapter resides at the Web server. The transport adapter at the data management system collects and converts variable data into data messages for communication with the document production system so a document composition engine may incorporate variable data in document layouts and printed documents. Soft documents generated by the document composition engine may be communicated to the data management system through the message bridge for proofing and approval.

13 Claims, 3 Drawing Sheets

METHOD AND SYSTEM FOR INTEGRATED PRODUCTION OF DOCUMENTS USING VARIABLE DATA FROM A DATA MANAGEMENT SYSTEM

FIELD OF THE INVENTION

The present invention relates generally to document production systems, and more particularly, to document production systems that generate documents from data obtained from data management systems.

BACKGROUND OF THE INVENTION

Data management systems store, maintain, and update data for the operation of a facility or function of a business. One example of a data management system is a customer relationship management (CRM) system. A customer relationship management system is a distributed processing system that typically includes a client interface, data management application, and a customer relationship database. The client interface is an application program that is used by a customer service representative to assist a customer with a purchase, technical assistance, or billing issues, for example. The data management application includes one or more computer programs that manage access to the customer relationship database or databases. The data management application arbitrates requests for customer relationship data, enables updates to the customer relationship data, and supports mining of the database or databases for the generation of reports used to evaluate customer needs or trends. The customer relationship database may include one or more databases or repositories in which variable data regarding customer relationships are stored. Typically, customer relationship data includes customer identification data, customer purchase histories, customer invoices and payment history, support issues and a history of the resolution of those issues, as well as other data corresponding to the relationship between a business or other entity and its various customers. Other data management systems include those that manage variable data for operation of a manufacturing facility, a warehouse/inventory function, sales/service organizations, and the like.

Document production systems typically include a document management station, a document data input station, one or more document processors, and a document printer. The document input station controls the input of data to be included in the documents generated by the document management system. Document data may be input to a document production system through a document scanner or from reading data stored on electronic media. A document scanner typically includes a platen and document illumination system for imaging a hard copy of a document to generate an electronic version of the document. Likewise, a disk drive or CD-ROM reader may be used to input data for document processing and printing.

Once document data are input to a document production system, the document management station may be used to generate a layout or template for a document. A layout or template is a document form with fields in which data is written before the document is printed. The document management station is also used to specify parameters for processing of a document for the printing and/or finishing of the print job. For example, the color rendering of a document, duplex or simplex reproduction, paper size, template selection and the like may be specified for a print job. Job finishing may include stapling or other binding required for the final production of a reproduced version of a document. The document processors perform a document composition process in which document templates are populated with data and processed for printing.

When a business desires to generate documents to market new products or services to existing customers, it currently has to extract the information from a data management system, such as its customer relationship system, and provide these data in a format acceptable for input to a document production system. These data may then be used to generate template forms for proofing by the data management system user. Once the template proofs are approved, a print job is performed in which the approved template is populated with the data provided from the data management system so the documents may be printed by the document production system.

One problem with this method of generating documents having variable data maintained by the data management system is the requirement of extracting the variable data from the data management system, preparing the data, and transporting the data to the document production system for input. During proofing, reviewers may become aware of additional data that may be useful for the documents being produced. If such an awareness arises, the data must be extracted, analyzed to confirm its usefulness, and then transported to the document production system for input. This is a time-consuming iterative process. Furthermore, data in the data management system are being updated during the document production process but the newly acquired data are unavailable for the documents being generated. Thus, the data within the produced documents may be dated by the time the documents are finally populated with data for printing.

There is a need, therefore, for a system and method for the timely provision of customer relationship data from a CRM system to a document production system to facilitate the generation of customer support documents.

There is also a need for a system and method for enabling the updating of document data with data from the CRM system during composition of documents by the document production system.

There is a need for a system and method for providing data from a data management system to a document production system to populate document templates and facilitate the generation of documents with the variable data from the data management system.

SUMMARY OF THE INVENTION

The present invention addresses the above needs, as well as others, by providing a message bridge for coupling a document production system and a data management system so data messages may be communicated between the two systems for the generation of documents by the document production system. An exemplary system incorporating the principles of the present invention for a document production system and a data management system includes a data management system having a data manager for obtaining variable data from a database, a document production system for composing documents containing the variable data obtained from the database, and a message bridge for coupling the data management system to the document production system so that the document production system and the data management system communicate data messages for the proofing and generation of documents populated with the variable data. Thus, the message bridge couples the document production system and the data manager of a data management system so that data may be communicated between the two systems and integrated into documents generated by the production system. This integration facilitates the generation of documents that incorporate variable data maintained by the data management system so that customer support documents and marketing materials, for example, may be more efficiently produced.

In accordance with the principles of the present invention, the message bridge includes a transport adapter for collecting and converting variable data into data messages for communication through the message bridge to the document production system. The transport adapter is preferably one or more computer programs that are resident in the data management system. The transport adapter also preferably includes a network adapter so that the data messages may be segmented into packets for network communication to the document production system. In order to make the integration of the data management system and document production system compatible with open connectivity standards, a Web server is preferably included in the message bridge for communicating data messages between the document composition engine and the transport adapter of the data management system. Additionally, the transport adapter includes a plurality of transport adapter components, some of which collect variable data via the data manager and other components convert the collected data into data messages for communication with the document production system.

The transport adapter of the system of the present invention may also receive document production system messages from the document production system. These data messages may include soft documents such as templates generated by the document production system or sample documents that incorporate variable data that were generated by the document composition engine. The soft documents may be delivered by the data manager to a client application interface so a user may proof the soft document and generate proofing commands for transmission to the document composition engine. The data messages from the document production system also include document composition message status messages that provide the data management system user with feedback regarding the soft document generation process at the document production system. The data messages from the document production system may also include queries for variable data that are needed for completion of a soft document being generated by the document composition engine. Thus, templates being used to generate hard copies may be populated with variable data at the time of document printing so that the variable data contained in the documents reflect the current data in the data management system.

The Web server of the present invention also includes transport adapter components that are preferably one or more computer programs that are resident in the Web server. These components provide variable data from the data messages to the document production system and generate data messages for the data management system using commands and status messages from the document production system. Thus, they form a message interface between the open connectivity standard of the Web server and the internal communications of the document production system components.

An exemplary method for data message communication between a document production system and a data management system includes obtaining variable data from a database in a data management system and coupling the data management system to a document production system with a message bridge so that the document production system and data management system communicate for the generation of documents containing the variable data. This exemplary method integrates the database of the data management system with the document production system to facilitate the generation of documents that incorporate variable data. Thus, documents incorporating variable data, such as customer support documents and marketing materials, may be more efficiently produced.

In accordance with the principles of the present invention, the exemplary method is preferably implemented by one or more computer programs that are resident in the data management system. The exemplary method also preferably includes segmenting the variable data messages into packets for network communication to the document production system. The exemplary method may also include communicating the variable data message packets in accordance with an open connectivity standard such as any of the standards supported by a Web server or the like.

The exemplary method of the present invention may also include receiving data messages from the document production system. These messages may include soft documents, such as templates without data, or templates populated with variable data that were generated by the document composition engine. The method may also include delivering soft documents from the document production system to a client application interface so a user may proof the soft document and generating proofing commands for transmission to the document composition engine. The method may also include providing document production system status messages regarding the document generation process. The method may also include querying for variable data that are needed for completion of a document being generated by the document composition engine. When the document is being generated for printing, the method of the present invention helps ensure the inclusion of current data in the printed document.

The above described features and advantages, as well as others, will become more readily apparent to those of ordinary skill in the art by reference to the following detailed description and accompanying drawings.

DETAILED DESCRIPTION

Figure 1:
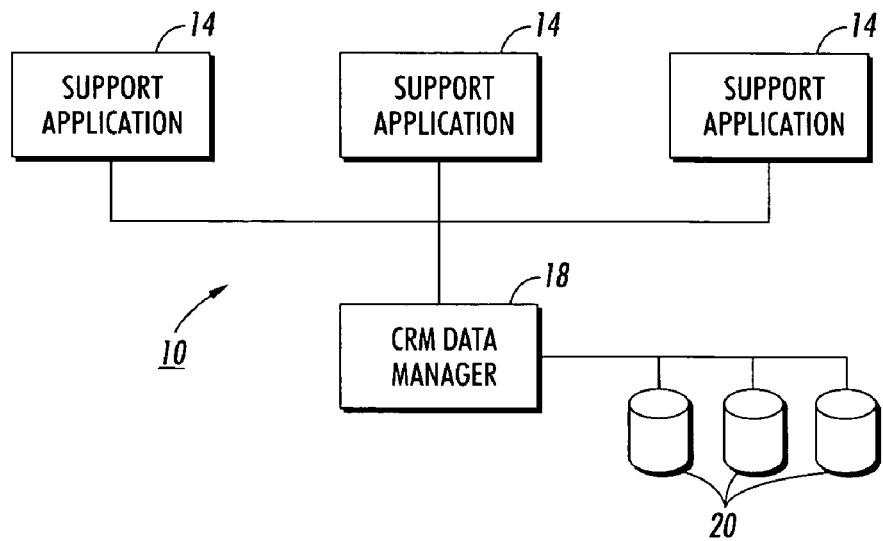
FIG. 1 shows a block diagram of a data management system being used as a customer relationship management (CRM) system.

FIG. 1 shows a data management system being used as a customer relationship management (CRM) system 10. System 10 includes one or more application client user interfaces available at customer relationship management (CRM) terminals 14, a CRM data manager 18, and one or more CRM databases 20. Typically, agents use CRM terminals 14 to query for and update customer data stored in CRM databases 20. CRM terminals 14 are typically personal computers or the like that may be comprised of a Pentium processor, 128 MB of RAM, and a 20 GB hard drive. Client applications executing on a CRM terminal are used to facilitate support of customers interacting with an agent using a CRM terminal 14. CRM terminals 14 may be ticket agent stations, technical support stations, point-of-sales terminals, telephone order stations, or the like. CRM data manager 18 is arbitrates access and updates for variable data regarding customer relationships stored in databases 20. Data manager 18 may include a processor with memory for the execution and support of computer programs to perform its variable data management function. The variable data stored in databases 20 include customer identification data, customer purchase data, customer invoice data, customer payment data, customer service data, and other data related to the management of customer relationships between a business and its customers. System 10 in FIG. 1 is merely exemplary of one implementation of a data management system. Data management systems may also be used for inventory management, manufacturing control, or the like.

Figure 2:
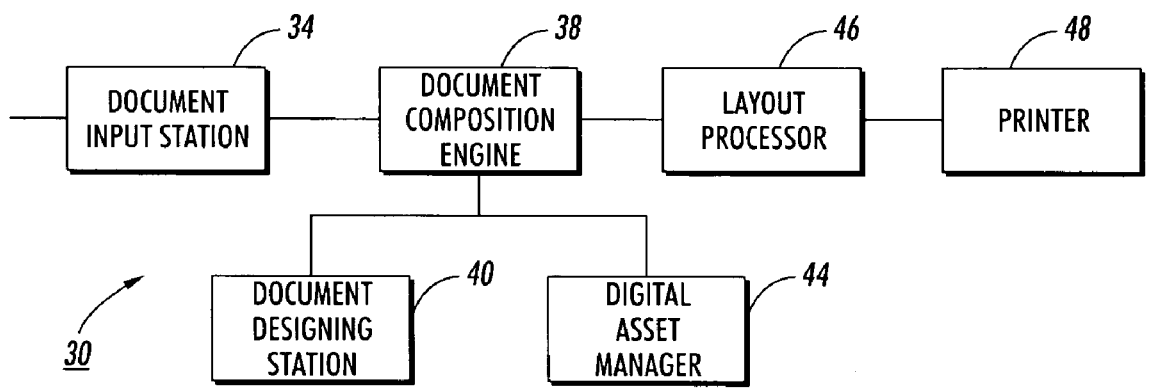
FIG. 2 shows a block diagram of a document production system.

A block diagram of a document production system 30 is shown in FIG. 2. System 30 is comprised of a document input station 34, a document composition engine 38, a document designing station 40, a digital asset manager 44, a layout processor 46, and a printer 48. Typical customers of operators for document production systems bring samples of documents that they want produced by the facility or they may bring documents embodying logos or other indicia that the operator of a document production system may want to obtain for use in the document production process. Document input station 34 may include a document scanner for converting hard copy documents into electronic documents for these and other purposes. Document input station 34 may also include electronic media readers for reading stored electronic versions of documents from storage media such as CD-ROMs, diskettes, or the like.

Document composition engine 38 is coupled to document input station 34, document designing station 40, digital asset manager 44, and layout processor 46. Document designing station 40 is typically a personal computer that executes application software to facilitate the development of a document template or layout. Using station 40, a document designer may view documents input through document input station 34 and extract information for storage as a digital asset through digital asset manager 44. A document designer may also use an electronic version of a document to generate a document template that also may be stored as a digital asset through digital asset manager 44. Alternatively, a document designer may retrieve digital assets, such as templates and document components, through digital asset manager 44 for purposes of constructing a document template or layout for a customer.

Document composition engine 38 is a computer with memory in which application programs execute to perform the commands entered by a document designer through designing station 40. These programs generate and modify a document layout in accordance with the instructions received from designer input station 40. Once a document layout is generated, it may be stored as a digital asset through digital asset manager 44 or it may be displayed at designer station 40 for approval by a customer or stored on electronic media at station 40. The electronic media may then be provided to a customer so the template proof may be reviewed at a customer's facility for approval or further instructions regarding preparation of the template.

Once approval of a document layout is obtained, a document designer may retrieve the document layout from digital asset manager 44 and provide it to layout processor 46 through document composition engine 38 with instructions for printing the document. Variable data from the data management system is provided through electronic media storage and made available for populating document templates during the printing process. Layout processor 46 includes one or more control stations for the production of a hard copy of a document comprised of a template and variable data. Processing performed by layout processor 46 includes trapping, imposition work, color separation, conversion to a plate file, and raster image generation. When layout processor 46 has finished generation of a document for printing, it may be provided to a printing device 48 for production of the hard copies of the document.

Previously, the data management system and document production system of FIGS. 1 and 2 were separate and independent of one another. If a manager of a CRM system wanted to take advantage of the CRM data stored in the CRM database for marketing purposes, for example, the manager had to use CRM data manager 18 to query CRM database 20 for customer variable data and then store the retrieved data on electronic media or print it out in hard copy form. The hard copies or electronic media could then be transported to a document production facility where document needs could be discussed with a document designer. The data from the CRM system could be scanned or read into document production system 30 for use in generating a document layout by document composition engine 38. Proofs of the document layout populated with dummy and/or variable data obtained from the CRM system could be viewed at a designer station 40 or stored on electronic media for transporting to the CRM system user for review, correction, and approval. This iterative process continued until the document layout or template was approved and stored as a digital asset. During a production run, the template may be retrieved and populated with variable data transported from the data management system in the offline manner described above. The populated documents could be processed for printing.

Figure 3:
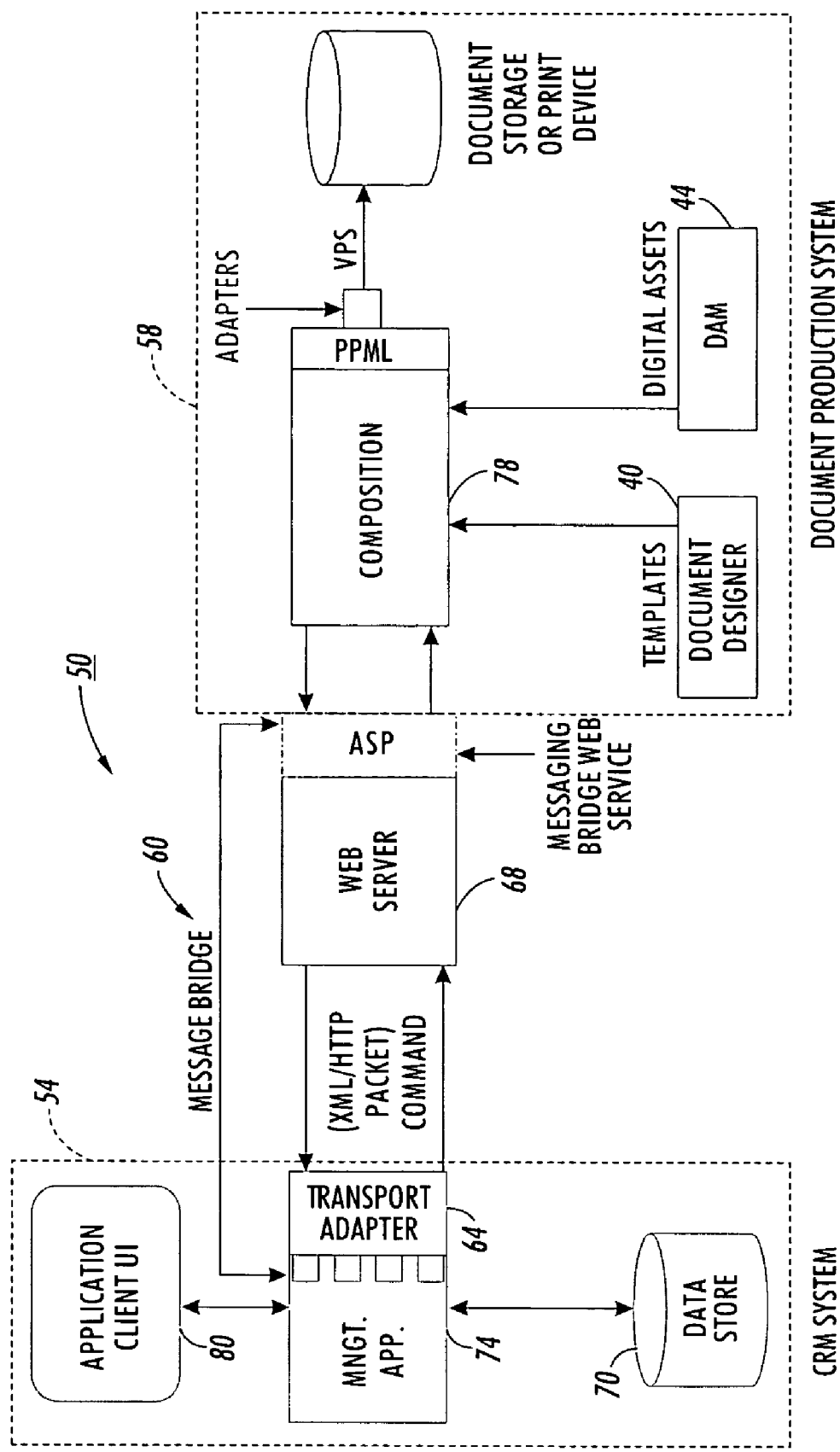
FIG. 3 shows a block diagram of a system incorporating the principles of the present invention for the integration of a data management system with a document production system.

An integrated data management system/document production system is shown in FIG. 3. System 50 depicts a data management system operating as a CRM system 54 and a document production system 58 that are coupled together by a message bridge 60. Message bridge 60 is preferably comprised of a transport adapter 64 and a Web server 68. Transport adapter 64 includes one or more transport adapter components that collect and convert variable data regarding customer relations obtained from CRM database 70 through CRM data manager 74 into data messages for transmission to Web server 68. These data messages are received by Web server 68 and processed by transport adapter components resident in Web server 68. The transport adapter components convert the data messages into a format for communication within the document production system. The transport adapter components of Web server 68 may communicate with document production system 58 through Active Server Page technology, which is available from Microsoft Corporation of Redmond, Wash. Document layouts generated by document composition engine 78 may be communicated through the transport adapter components of Web server 68 to the components of transport adapter 64. These document layouts may be provided by CRM data manager 74 to a customer support or marketing application 80 for review and correction. Instructions regarding alteration of a document layout may be provided by application 80 to document composition engine 78 through data manager 74, transport adapter 64, and the transport adapter components of Web server 68.

Preferably, document composition engine 78 generates document layouts in a document description format, such as the .PDF format as well as other known document description formats. The document layouts or templates may be generated with dummy data and/or variable data from data management system 54 for proofing at system 54. By using known document description formats, application 80 may be a known document viewer that supports proof marks and comments, such as the Adobe Acrobat program available from Adobe, Inc. of San Jose, Calif. The marked document layouts may then be provided to transport adapter 64 for conversion into data messages that may be transmitted to Web server 68 so the transport adapter components of server 68 may convert the data into a form for communication within system 58. Alternatively, application 80 may be a document designing application and known document layout commands may be converted into data messages for document composition engine 78.

Message bridge 60 is shown with Web server 68 for communicating data messages with transport adapter 64. However, proprietary network communication interfaces or other known wide area network (WAN) or local area network (LAN) methodologies may be used instead of open network methodologies used for the World Wide Web. Web server 68 also includes transport adapter components for converting data into messages having a format that may be communicated with document production system 58. Message bridge 60 provides variable data, such as CRM data, and document layout feedback data to a document production system in a real-time manner. Real-time in this description means that offline processing, such as reading electronic media or document scanning, is not required to provide data content to document production system 58. Instead, data management system 54 and document production system 58 are integrated in such a way that variable data communication, document layout generation, and document layout proofing and approval may be performed without requiring offline processing. The system also enables document production system 58 to query data management system 54 for data at the start of a production run so current variable data may be obtained and used to populate a document template for a printing run.

The components of transport adapter 64 may be application programs, applets, or terminate-stay-resident (TSR) programs that execute within one or more computers used to implement CRM system 54. Likewise, the components of the transport adapter in Web server 68 may be application programs, applets, or terminate-stay-resident (TSR) programs that execute within Web sever 68. The programs implementing the transport adapter in data management system 54 or Web server 68 may include communication interfaces with known network communication software/hardware modules for supporting communication with Web server 68. The components of transport adapter 64 include components for interrogating CRM database 70 using known query languages and methods to collect data and components for selecting subsets or groups of the collected data for transmission to a document production system. Transport adapter 64 may also include components for receiving data messages from a document production system and distributing the data from those messages to other transport adapter components or other application programs in CRM system 54. The transport adapter components in Web server 68 convert data management system messages into a format compatible with document production system 58 and also provide system 58 status and query messages through message bridge 60 to data management system 54.

Figure 4:
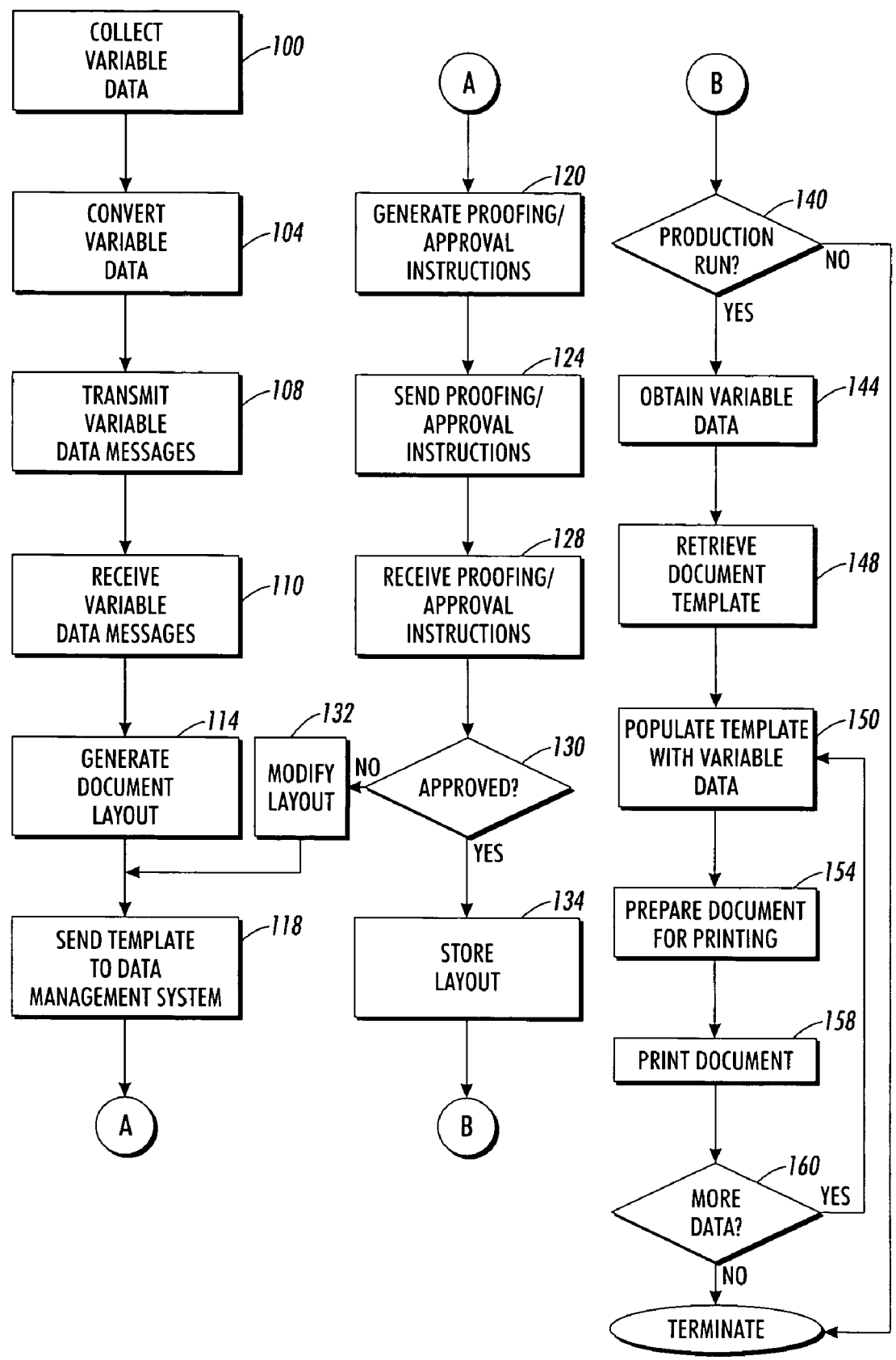
FIG. 4 is a flow diagram of an exemplary method for communication integration of a document production system and a data management system.

An exemplary method in accordance with the principles of the present invention is shown in FIG. 4. The process collects variable data (block 100) and converts the collected variable data into data messages (block 104). The data messages containing the variable data are transmitted to a document production system via a message bridge coupled between a data management system and the document production system (block 108). The data messages are received at the document production system (block 110), where a document composition engine generates a document layout populated with variable data for proofing (block 114). The generated document layout is transmitted to the data management system via the message bridge (block 118). A user at the data management system either uses a transport adapter component or an application program to generate proofing instructions or layout approval (block 120). The proofing instructions or layout approval are sent via the message bridge to the document production system (block 124). If proofing instructions were sent (block 128), the document layout is modified in accordance with the instructions (block 132) and the modified document layout is returned to the data management system for further review (block 118). Otherwise, once approval is confirmed (block 130), the approved document layout or template is stored for later use (block 134). When a document production run is commenced (block 140), the document production system queries the data management system for the variable data to be used for generating versions (block 144). The approved template is retrieved (block 148) and populated with variable data (block 150). Alternatively, a document production run may be commenced by the document management system through message bridge 60 and the variable data for populating the approved template for hard copy print production obtained through the bridge. Additional processing is performed for printing preparation (block 154) and the document is printed (block 158). The process continues until all of the documents incorporating the variable data have been printed (block 160).

In operation, message bridge components are added to a data management system and an external communication hub, such as a Web server, for a document production system. More specifically, transport adapter components are added to a data management system and to the external communication hub. The transport adapter components are coupled together through the external communication hub to form a message bridge between the two systems. Thereafter, a user may collect variable data from the data management system and convert the data into data messages for transmission to the document production system. There a document designer may use the data with document templates or other digital assets to generate a template proof. The template proof may be sent to an application program in the data management system via the message bridge so the user may generate proofing instructions or layout approval. The instructions or approval are sent via the message bridge to the document production system so the composition engine may be operated to modify or store the document layout. When hard copies of documents are produced, the document production system may query the data management system for current variable data, retrieve the template for the print job, and generate templates populated with variable data for hard copy printing. Thus, the system and method of the present invention may be used to integrate a data management system and a document production system so that variable data may be more easily provided to the document production system and the proofing process facilitated by communication through the message bridge.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system comprising:
   a data management system having a data manager for obtaining variable data from a database;
   a document production system for composing documents containing the variable data obtained from the database, the document production system including:
      a document input station configured to generate a soft document in accordance with an input document;
      a document composition engine being configured to generate a document layout in accordance with the soft document;
      a document designing station configured to enable proofing and modification of the document layout;
      a layout processor configured to generate at least one document in accordance with the document layout, the at least one document being populated with the variable data and being formatted for printing; and
      a printer configured to print the at least one document; and
   a message bridge for coupling the data management system to the document production system to enable the document production system and data management system to communicate data messages that enable the proofing of the document layout at the document designing station and generation of the at least one document populated with the variable data at the layout processor.

2. The system of claim 1, the message bridge further comprising:
   a transport adapter for collecting and converting variable data elements into data messages for transmission to the document composition engine.

3. The system of claim 2, the transport adapter further comprising:
   a plurality of transport adapter components, some of the transport adapter components collecting variable data and other transport adapter components converting the collected variable data into data messages for transmission to the document production system.

4. The system of claim 2, the transport adapter further comprising:
   at least one transport adapter component for receiving document production system messages containing data from the document production system.

5. The system of claim 4, the document production system messages including:
   document production system status messages.

6. The system of claim 4, the document production system messages including:
   queries for variable data from the data management system.

7. The system of claim 2, the message bridge further comprising:
   a Web server having transport adapter components for communicating with the document production system.

8. A method for communicating between a document production system and a data management system comprising:
   generating a document layout at a document input station of a document production system, the document layout being generated in accordance with a soft document;
   receiving the document layout at a document designer station of the document production system, the document designer station being configured to enable the proofing and modification of the document layout;
   obtaining variable data from a database in a data management system;
   generating at least one document in accordance with the proofed document layout at a layout processor of the document production system, the at least one document including the variable data;
   printing the at least one document at a printer of the document production system; and
   coupling the data management system to the document production system through a message bridge to enable the document production system and data management system to communicate data messages that enable the proofing of the document layout at the document designing station and generation of the at least one document populated with the variable data at the layout processor.

9. The method of claim 8, the obtaining of the variable data further comprising:
   collecting and converting variable data into data messages for transmission to the document production system.

10. The method of claim 9, further comprising:
    receiving document production messages containing data from the document production system.

11. The method of claim 10, the document production system message reception including:
    receiving document production system status messages.

12. The method of claim 10, the document production system message reception including:
    receiving queries for variable data from the data management system.

13. The method of claim 9 further comprising:
    communicating the data messages with transport adapter components in a Web server.

* * * * *